(12) United States Patent
Hsiao

(10) Patent No.: US 10,528,263 B2
(45) Date of Patent: Jan. 7, 2020

(54) DATA STORAGE DEVICE AND DATA MAINTENANCE METHOD THEREOF

(71) Applicant: Silicon Motion, Inc., Jhubei, Hsinchu County (TW)

(72) Inventor: Wei-Yi Hsiao, Kaohsiung (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 249 days.

(21) Appl. No.: 15/215,279

(22) Filed: Jul. 20, 2016

(65) Prior Publication Data
US 2017/0075575 A1    Mar. 16, 2017

(30) Foreign Application Priority Data
Sep. 15, 2015   (TW) ............................. 104130400 A

(51) Int. Cl.
*G06F 3/06* (2006.01)
(52) U.S. Cl.
CPC .............. *G06F 3/061* (2013.01); *G06F 3/064* (2013.01); *G06F 3/0679* (2013.01)
(58) Field of Classification Search
CPC ......... G06F 3/061; G06F 3/064; G06F 3/0679
See application file for complete search history.

(56) References Cited

U.S. PATENT DOCUMENTS

| | | | |
|---|---|---|---|
| 9,372,802 B2 | 6/2016 | Wu et al. | |
| 2010/0223420 A1* | 9/2010 | Ahn | G06F 12/0246 711/103 |
| 2010/0332732 A1* | 12/2010 | Chiang | G06F 12/0246 711/103 |
| 2011/0004720 A1* | 1/2011 | Chiang | G06F 12/0246 711/103 |
| 2011/0055232 A1 | 3/2011 | Graefe | |
| 2014/0129808 A1 | 5/2014 | Naveh et al. | |
| 2014/0281679 A1 | 9/2014 | Giroux et al. | |
| 2015/0058553 A1 | 2/2015 | Wu et al. | |

FOREIGN PATENT DOCUMENTS

| | | |
|---|---|---|
| CN | 104049905 A | 9/2014 |
| TW | 201447743 | 12/2014 |
| TW | 201508484 | 3/2015 |

\* cited by examiner

*Primary Examiner* — David Yi
*Assistant Examiner* — Alan Otto
(74) *Attorney, Agent, or Firm* — McClure, Qualey & Rodack, LLP

(57) ABSTRACT

The present invention provides a data storage device including a flash memory and a controller. The controller writes the first data sector into a first physical page of the physical pages in response to a write command arranged to write a first data sector into a first logical page, records the mapping relationship of the first logical page and the first physical page in a first large-data-maintenance table and determines whether a small-data-maintenance table has a first data link of the first logical page when one of the large-data-maintenance tables is the first large-data-maintenance table corresponding to the first logical block and the first data sector is less than a predetermined length, and deletes the first data link of the small-data-maintenance table when the small-data-maintenance table has the first data link of the first logical page.

14 Claims, 7 Drawing Sheets

| | | SDT |
|---|---|---|
| C0 | FP4 | (HB0, HP3) |
| C1 | FP14 | (HB2, HP4) |
| C2 | FP18 | (HB2, HP1) |
| C3 | FP3 | (HB0, HP6) |
| C4 | FP20 | (HB2, HP3) |
| C5 | FP30 | (HB7, HP0) |
| C6 | FP2 | (HB0, HP10) |
| C7 | FP21 | (HB2, HP9) |
| C8 | FP11 | (HB0, HP4) |
| C9 | FP31 | (HB7, HP4) |
| C10 | FP29 | (HB7, HP5) |
| C11 | FP28 | (HB7, HP2) | organize "HB0" →

| | | SDT |
|---|---|---|
| C0 | FP3 | (HB0, HP3) |
| C1 | FP14 | (HB2, HP4) |
| C2 | FP18 | (HB2, HP1) |
| C3 | FP6 | (HB0, HP6) |
| C4 | FP20 | (HB2, HP3) |
| C5 | FP30 | (HB7, HP0) |
| C6 | FP10 | (HB0, HP10) |
| C7 | FP21 | (HB2, HP9) |
| C8 | FP4 | (HB0, HP4) |
| C9 | FP31 | (HB7, HP4) |
| C10 | FP29 | (HB7, HP5) |
| C11 | FP28 | (HB7, HP2) |

FIG. 5

DATA STORAGE DEVICE AND DATA MAINTENANCE METHOD THEREOF

CROSS REFERENCE TO RELATED APPLICATIONS

This Application claims priority of Taiwan Patent Application No. 104130400, filed on Sep. 15, 2015, the entirety of which is incorporated by reference herein.

BACKGROUND OF THE INVENTION

Field of the Invention

The present invention is related to a data maintenance method; in particular to a data maintenance method using two maintenance tables.

Description of the Related Art

Flash memory is considered a non-volatile data-storage device, using electrical methods to erase and program itself. NAND Flash, for example, is often used in memory cards, USB flash devices, solid state devices, eMMCs, and other memory devices.

Flash memory such as NAND Flash uses a multiple-block structure to store data. Each block contains multiple pages, wherein the write unit of the flash memory is the page, and the erase unit of the flash memory is the block. Each of the data sectors stored in the flash memory needs to be recorded, and the method of recording data affects the performance of the controller. Therefore, a method that can effectively maintain data is needed.

BRIEF SUMMARY OF THE INVENTION

A detailed description is given in the following embodiments with reference to the accompanying drawings.

An exemplary embodiment provides a data storage device including a flash memory and a controller. The flash memory includes a plurality of physical blocks, each of the physical blocks has a plurality of physical pages. The controller receives a write command arranged to write a first data sector into a first logical page, writes the first data sector into at least one first physical page of the physical pages in response to the write command, determines whether a plurality of large-data-maintenance tables includes a first large-data-maintenance table corresponding to a first logical block including the first logical page when the length of the first data sector is less than a predetermined length, records the mapping relationship of the first logical page and the first physical page in the first large-data-maintenance table and determines whether a small-data-maintenance table has at least one first data link of the at least one first logical page when one of the large-data-maintenance tables is the first large-data-maintenance table corresponding to the first logical block, and deletes the first data link of the small-data-maintenance table when the small-data-maintenance table has the first data link of the first logical page.

Another exemplary embodiment provides a data maintenance method applied to a data storage device, wherein the data storage device has a plurality of physical blocks, and each of the physical blocks has a plurality of physical pages. The data maintenance method includes: receiving a write command arranged to write a first data sector into at least one first logical page for writing the first data sector into at least one first physical page of the physical pages; determining whether the length of the first data sector is more than a predetermined length; determining if any of the large-data-maintenance tables corresponds to the first logical block having the first logical page when the length of the first data sector is less than a predetermined length; recording the mapping relationship of the first logical page and the first physical page in the first large-data-maintenance table and determining whether the small-data-maintenance table has at least one first data link corresponding to the first logical page when a first large-data-maintenance table of the large-data-maintenance tables corresponds to the first logical block; and deleting the first data link of the small-data-maintenance table when the small-data-maintenance table has the first data link of the first logical page.

BRIEF DESCRIPTION OF THE DRAWINGS

The present invention can be more fully understood by reading the subsequent detailed description and examples with references made to the accompanying drawings, wherein:

FIG. 5 is a schematic diagram illustrating a small-data-maintenance table, constructed in accordance with some embodiments.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
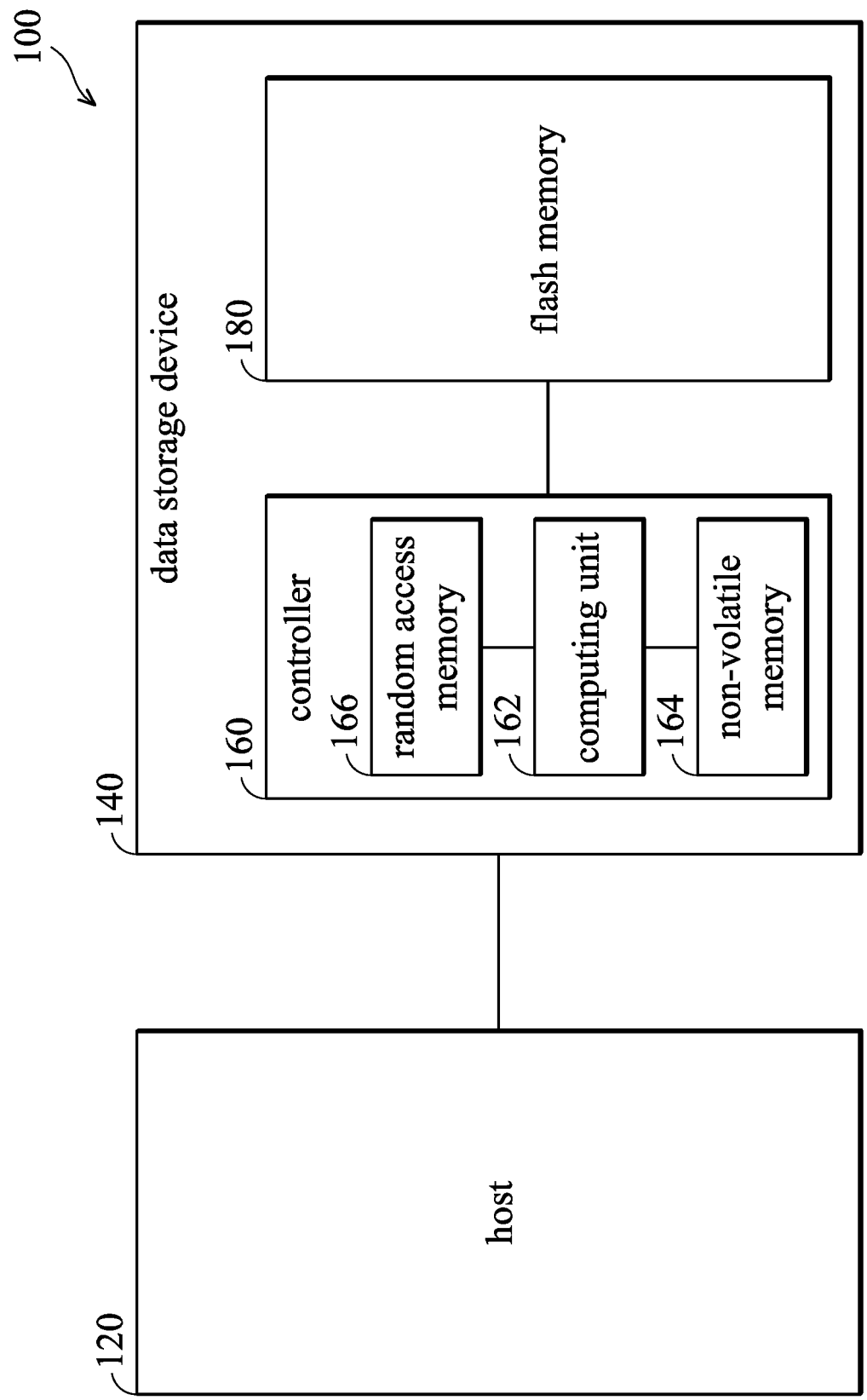
FIG. 1 is a schematic diagram illustrating an electronic system, constructed in accordance with some embodiments.

FIG. 1 is a schematic diagram illustrating an electronic system, constructed in accordance with some embodiments. The electronic system 100 includes a host 120 and a data storage device 140. The data storage device 140 includes a flash memory 180 and a controller 160, and operates in response to the commands of the host 120.

The controller 160 includes a computing unit 162, a non-volatile memory 164 (ROM) and a random access memory 166 (RAM). The non-volatile memory 164, the program code stored in the non-volatile memory 164 and data stored in the non-volatile memory 164 constitute firmware executed by the computing unit 162, and the controller 160 is configured to control the flash memory 180 based on the firmware.

The flash memory 180 includes a plurality of physical blocks, each of the physical blocks includes a plurality of physical pages. It should be noted that each of the physical blocks has a corresponding logical block and each of the physical pages has a corresponding logical page, wherein the logical blocks and the logical pages are the logic address used for defining the physical blocks and the physical pages to maintain the data of the flash memory 180. In one of the embodiments, the controller 160 can record the mapping relationships of the physical pages, the physical blocks, the logical pages and the logical blocks by a small-data-maintenance table and a plurality of large-data-maintenance tables. It should be noted that the small-data-maintenance table is arranged to maintain the data sector that is less than a predetermined length and written in response to a write command. For example, the small-data-maintenance table is arranged to maintain the data sector that is less than the length of one physical page, wherein the small-data-maintenance table is arranged to record the physical blocks and the physical pages that are corresponding to the logical pages, but it is not limited thereto. In other embodiments, the predetermined length may be the length of two pages, three pages, five pages or ten pages. The large-data-maintenance tables are arranged to maintain the data that is sequentially written into the flash memory 180. Namely, the large-data-maintenance tables are arranged to maintain the data sector that is more than the predetermined length and written in response to a write command. For example, the large-data-maintenance tables are arranged to maintain the data sector that is more than the length of one physical page. Moreover, in one of the embodiments, each of the large-data-maintenance tables corresponds to a physical block (logical block), and each of the large-data-maintenance tables is arranged to record the mapping relationships (data links) of the logical pages and the physical pages in one block. Namely, each of the large-data-maintenance tables is arranged to record the data links of the physical pages of a physical block and the logical pages of the logical block corresponding to the physical block. Therefore, in this embodiment, the data storage device 140 further includes a physical-to-logical-block-mapping table arranged to record the mapping relationships of the physical block and the logical block having the corresponding large-data-maintenance table. Namely, the controller 160 can use the physical-to-logical-block-mapping table to determine whether the logical block has the corresponding large-data-maintenance table and the logical block corresponds to which physical block. It should be noted that the physical-to-logical-block-mapping table, the large-data-maintenance table and/or the small-data-maintenance table can be stored in the flash memory 180, and the controller 160 can load the physical-to-logical-block-mapping table, the large-data-maintenance table and the small-data-maintenance table into the random access memory 166 to manage the tables.

Figure 2:
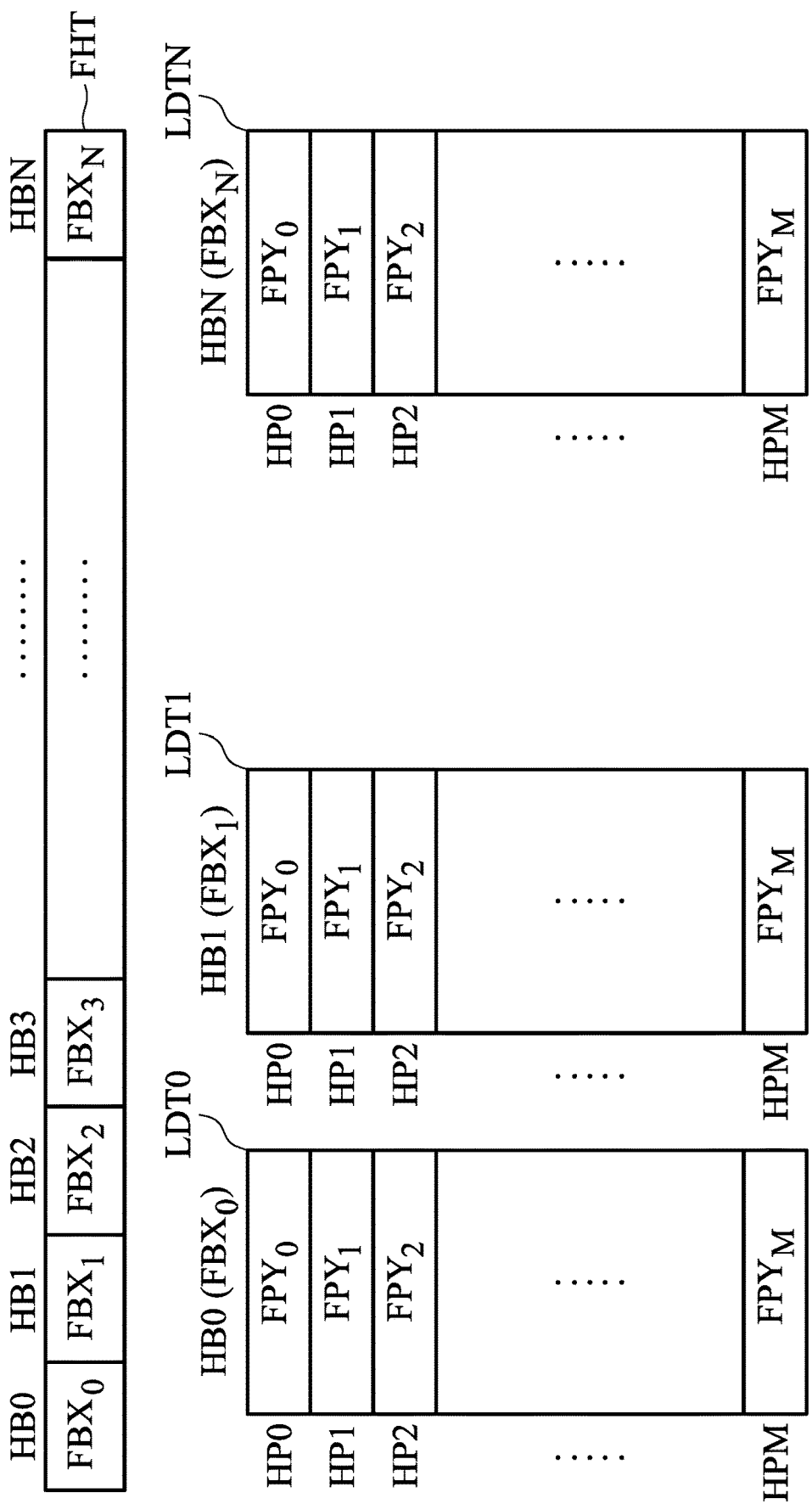
FIG. 2 is a schematic diagram illustrating a large-data-maintenance table and a physical-to-logical-block-mapping table, constructed in accordance with some embodiments.

FIG. 2 is a schematic diagram illustrating a large-data-maintenance table and a physical-to-logical-block-mapping table, constructed in accordance with some embodiments. As shown in FIG. 2, the FIG. 2 shows a physical-to-logical-block-mapping table FHT and a plurality of large-data-maintenance tables LDT0~LDTN. The physical-to-logical-block-mapping table FHT includes a plurality of columns represent the logical blocks HB0~HBN, and the columns are arranged to record the physical blocks FBX0~FBXN mapping (linking) to the logical blocks HB0~HBN. For example, the column of FBX0 stores the parameter of FB3 when the logical block HB0 maps to the physical block FB3, the column of FBX1 stores the parameter of FB6 when the logical block HB1 maps to the physical block FB6, and so on. The large-data-maintenance tables LDT0~LDTN are arranged to record the mapping relationships (linking relationships) of the physical pages and the logical pages. For example, the large-data-maintenance table LDT0 is arranged to record the mapping relationships of the physical pages of the logical block HB0 (the physical block FBX0) and the logical pages, the large-data-maintenance table LDT1 is arranged to record the mapping relationships of the physical pages of the logical block HB1 (the physical block FBX1) and the logical pages, the large-data-maintenance table LDT2 is arranged to record the mapping relationships of the physical pages of the logical block HB2 (the physical block FBX2) and the logical pages, and so on. Each of the large-data-maintenance tables LDT0~LDTN has a plurality of columns, the columns represent the logical pages HP0~HPM of the logical blocks, and the columns are arranged to record the physical pages FPY0~FPYM mapping (linking) to the logical pages HP0~HPM. Take the large-data-maintenance table LDT0 as an example, the large-data-maintenance table LDT0 is arranged to record the mapping relationships of the physical pages of the logical block HB0 and the corresponding logical pages. The large-data-maintenance table LDT0 includes a plurality of columns, each of the columns represents one of the logical pages HP0~HPM of the logical block HB0, and the columns records the physical pages FPY0~FPYM mapping to the logical pages HP0~HPM. For example, the column of FPY0 stores the parameter of FP4 when the logical page HP0 is mapped to the physical page FP4, the column of FPY0 stores the parameter of FP6 when the logical page HP1 is mapped to the physical page FP6, and so on. When the controller 160 writes data into a specific logical page of a specific logical block, the controller 160 selects an available physical block from the flash memory to write the data into a specific physical page of the selected physical block, write the parameter of the written physical block into the column of the specific logical block in the physical-to-logical-block-mapping table FHT, and writes the parameter of the specific physical page into the column of the specific logical page in the large-data-maintenance table of the specific logical block. For example, when the controller 160 writes data into the logical page HP2 of the logical block HB2, the controller 160 selects an available physical block FB10 from the flash memory to write data into the physical page FP14 of the physical block FB10, writes the parameter of the physical block FB10 into the column of the logical block HB2 of the physical-to-logical-block-mapping table FHT, and write the parameter of the physical page FP14 into the column of the logical page HP2 in the large-data-maintenance table LDT2 corresponding to the logical block HB2. Namely, in this embodiment, the column of the FBX2 of the physical-to-logical-block-mapping table FHT records the parameter of FB10, the column of FPY2 in large-data-maintenance table LDT2 stores the parameter of FP14. Therefore, the controller 160 can locate the physical block mapped to the logical block according to the physical-to-logical-block-mapping table FHT, and locate the physical page mapped to the logical page according to the large-data-maintenance tables LDT0~LDTN.

Figure 3:
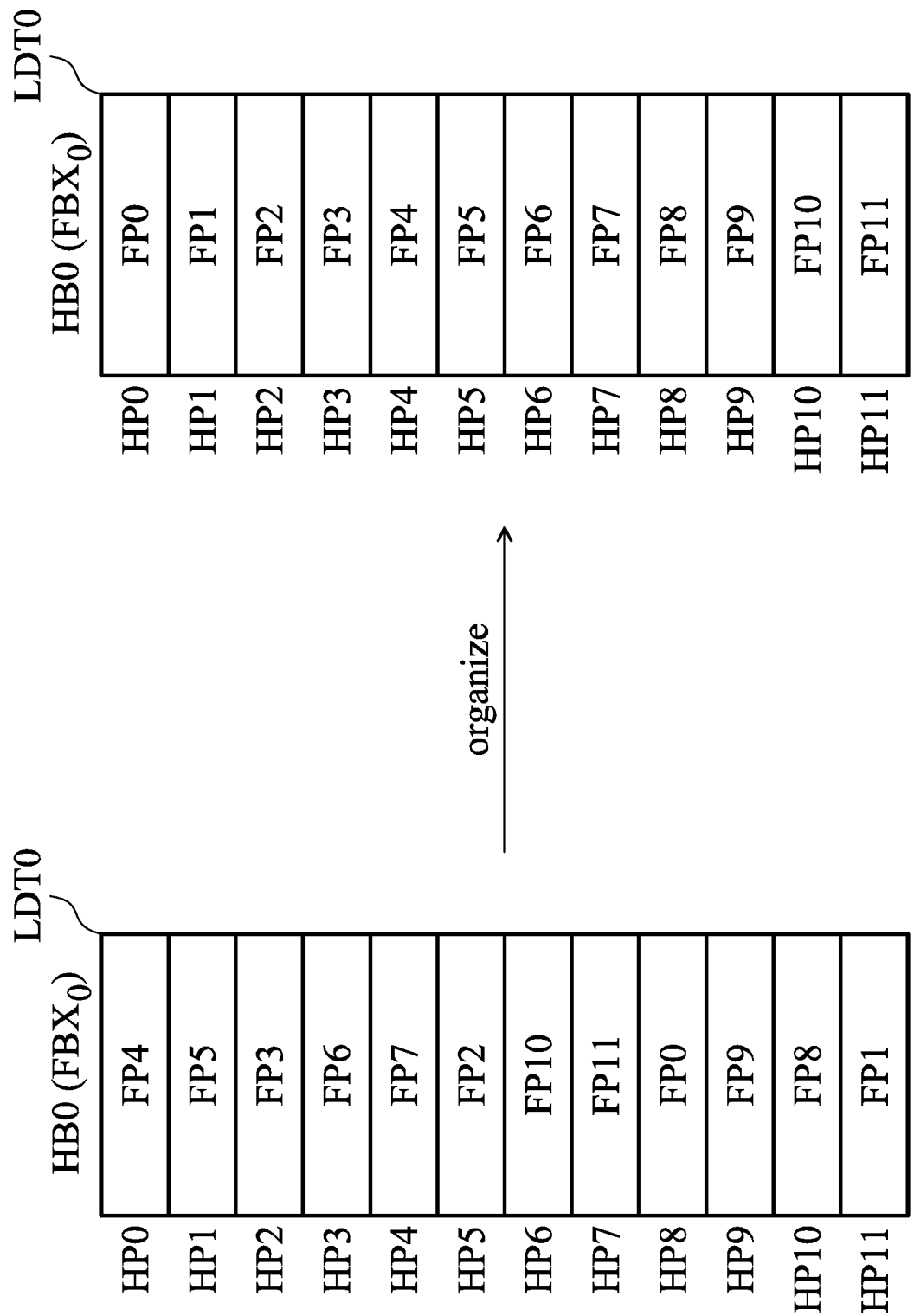
FIG. 3 is a schematic diagram illustrating a large-data-maintenance table, constructed in accordance with some embodiments.

However, the memory space of the random access memory 166 for the large-data-maintenance tables LDT0~LDTN is limited. Therefore, when the number of large-data-maintenance tables LDT0~LDTN is more than a first predetermined threshold, and the controller 160 selects the oldest large-data-maintenance table to organize the oldest large-data-maintenance table. The first predetermined threshold can be 6, 7, 8, 9, 10, and etc., but it is not limited thereto. Take the large-data-maintenance tables LDT0 as an example. As shown in FIG. 3, the logical block HB0 corresponding to the large-data-maintenance tables LDT0 has 12 logical pages HP0~HP11. In this embodiment, the logical page HP0 is mapped to the physical page FP4, the logical page HP1 is mapped to the physical page FP5, the logical page HP2 is mapped to the physical page FP3, the logical page HP3 is mapped to the physical page FP6, the logical page HP4 is mapped to the physical page FP7, the logical page HP5 is mapped to the physical page FP2, the logical page HP6 is mapped to the physical page FP10, the logical page HP7 is mapped to the physical page FP11, the logical page HP8 is mapped to the physical page FP0, the logical page HP9 is mapped to the physical page FP9, the logical page HP10 is mapped to the physical page FP8, and the logical page HP11 is mapped to the physical page FP1. The controller 160 organizes the large-data-maintenance table LDT0 by moving the data of the physical pages. As shown in FIG. 3, the organized physical pages FP0~FP11 are arranged in sequence for sequentially mapping to the logical pages HP0~HP11. Therefore, the data storage device 140 does not need the large-data-maintenance tables LDT0 to obtain the mapping relationships. The organized large-data-maintenance tables LDT0 can be deleted.

Figure 4:
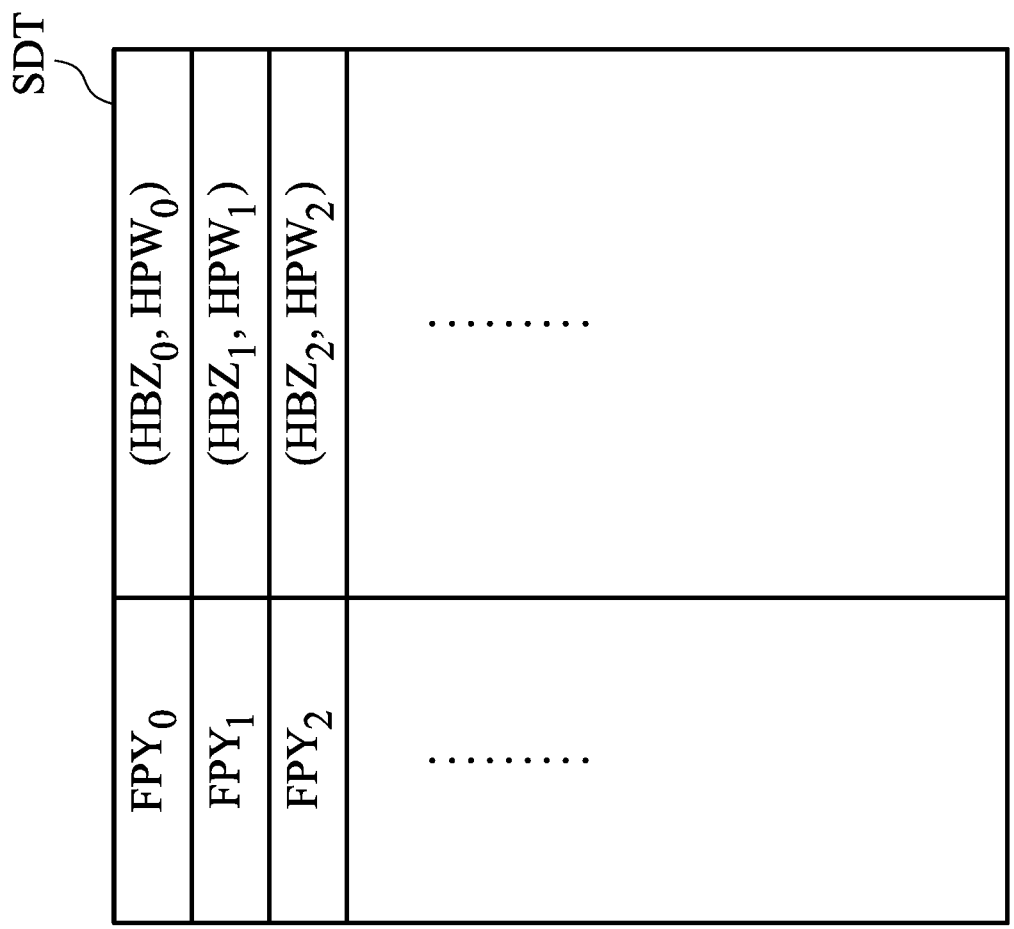
FIG. 4 is a schematic diagram illustrating a small-data-maintenance table, constructed in accordance with some embodiments.

FIG. 4 is a schematic diagram illustrating a small-data-maintenance table, constructed in accordance with some embodiments. The small-data-maintenance table SDT includes a plurality of columns, each of the columns includes two sub-columns. When the controller 160 writes data into a specific logical page of a specific logical block, the controller 160 selects a specific physical page from the flash memory 180, and writes the data into the specific physical page. Next, the controller 160 writes the parameter of the specific physical page into the first sub-column of a column of the small-data-maintenance table SDT, and writes the parameters of the specific logical block and the specific logical page into the second sub-column of the column, as shown in FIG. 4. For example, when the controller 160 write the data into the logical page HP3 of the logical block HB0, the controller 160 selects the available physical page FP120 from the flash memory 180, and writes the data into the physical page FP120. Next, the controller 160 writes the parameter of the physical page FP120 into the first sub-column of the first column of the small-data-maintenance table SDT, and writes the parameters of the logical block HB0 and the logical page HP3 into the second sub-column. Namely the first column of FPY0 stores the parameter of FP120, HBZ0 is the parameter of HB0, and HPW0 is the parameter of HP3. When the controller 160 writes data into the logical page HP7 of the logical block HB5, the controller 160 selects an available physical page FP30 from the flash memory 180, and writes the data into the physical page FP30. Next, the controller 160 writes the parameter of the physical page FP30 into the first sub-column of the second column of the small-data-maintenance table SDT, and writes the parameters of the logical block HB5 and the logical page HP7 into the second sub-column of the second column. Namely, the second column of FPY1 stores the parameter of FP30, the parameter of HBZ1 is HB5 and the parameter of HPW1 is HP7. When the controller 160 writes data into the logical page HP14 of the logical block HB0, the controller 160 selects an available physical page FP40 from the flash memory 180 to write the data into the physical page FP40. Next, the controller 160 writes the parameter of the physical page FP40 into the first sub-column of the third column of the small-data-maintenance table SDT, and writes the parameters of the logical block HB0 and the logical page HP14 into the second sub-column of the third column. Namely, the third column of FPY2 stores the parameter of FP40, the parameter of HBZ2 is HB0, the parameter of HPW2 is HP14, and so on.

However, the memory space of the random access memory 166 for the columns of the small-data-maintenance table SDT is limited. Therefore, when the number of columns of the small-data-maintenance table SDT is more than a second predetermined threshold, the controller 160 selects the small-data-maintenance table to organize. As shown in FIG. 5, the second predetermined threshold can be 128, 130, 160, etc., but it is not limited thereto. It should be noted that the first predetermined threshold is less than the second predetermined threshold, but it is not limited thereto. As shown in FIG. 5, the small-data-maintenance table SDT has 12 data links in the columns C0~C11. In this embodiment, before the organization, the column C0 records that the logical page HP3 of the logical block HB0 is mapped to the physical page FP4, the column C1 records that the logical page HP4 of the logical block HB2 is mapped to the physical page FP14, the column C2 records that the logical page HP1 of the logical block HB2 is mapped to the physical page FP18, the column C3 records that the logical page HP6 of the logical block HB0 is mapped to the physical page FP3, the column C4 records that the logical page HP3 of the logical block HB2 is mapped to the physical page FP20, the column C5 records that the logical page HP0 of the logical block HB7 is mapped to the physical page FP30, the column C6 records that the logical page HP10 of the logical block HB0 is mapped to the physical page FP2, the column C7 records that the logical page HP9 of the logical block HB2 is mapped to the physical page FP21, the column C8 records that the logical page HP4 of the logical block HB0 is mapped to the physical page FP11, the column C9 records that the logical page HP4 of the logical block HB7 is mapped to the physical page FP31, the column C10 records that the logical page HP5 of the logical block HB7 is mapped to the physical page FP29, the column C11 records that the logical page HP2 of the logical block HB7 is mapped to the physical page FP28. The controller 160 organizes the small-data-maintenance table SDT by selecting a logical block and organizing the physical pages of the selected logical block. As shown in FIG. 5, the controller 160 selects the logical block HB0 to perform the organization. The columns C0, C3, C6 and C8 have the parameters of the logical block HB0. After the organization, the physical pages of the columns C0, C3, C6 and C8 are sequentially mapping to the logical pages of the logical block HB0. Therefore, the data storage device 140 does not need the mapping relationships stored in the columns C0, C3, C6 and C8, and the columns C0, C3, C6 and C8 can be deleted. It should be noted that, in this embodiment, the physical pages of the small-data-maintenance table SDT are numbered without the unit of physical blocks, wherein the number of the physical page can be used to obtain the corresponding physical block. For example, when each of the physical blocks has 12 physical pages, the physical page FP20 corresponds to the physical page FP8 of the physical block FB2, and so on.

As described above, one of the embodiments uses the physical-to-logical-block-mapping table FHT and the large-data-maintenance tables LDT0~LDTN to maintain the data that is more than a predetermined length, and uses the small-data-maintenance table SDT to maintain the data that is less than the predetermined length. It should be noted that the predetermined length is equal to the length of one physical page, but it is not limited thereto. Moreover, the priority of large-data-maintenance tables LDT0~LDTN are higher than the small-data-maintenance table SDT.

More specifically, the controller 160 receives a write command arranged to write a first data sector into at least one first logical page for writing the first data sector into at least one first physical page of the physical pages. Next, the controller 160 determines whether the length of the first data sector is more than the predetermined length to decide the first data sector is belong to big data or small data.

When the first data sector is less than the predetermined length, the controller 160 determines whether any of the large-data-maintenance tables LDT0~LDTN corresponds to a first logical block that includes the first logical page. In one embodiment, the controller 160 determines whether the physical-to-logical-block-mapping table FHT contains the mapping relationship of the first logical block to determine whether any of the large-data-maintenance tables LDT0~LDTN corresponds to the first logical block having the first logical page, but it is not limited thereto. When a first large-data-maintenance table of the large-data-maintenance tables LDT0~LDTN corresponds to the first logical block, the controller 160 records the mapping relationship of the first logical page and the first physical page in the first large-data-maintenance table, and determines whether the small-data-maintenance table SDT has at least one first data link of the first logical page. When the small-data-maintenance table SDT has the first data link of the first logical page, the controller 160 deletes the first data link of the small-data-maintenance table SDT. When the first data sector is less than the predetermined length and none of the large-data-maintenance tables LDT0~LDTN corresponds to the first logical block, the controller 160 records the mapping relationship of the first logical page and the first physical page in the small-data-maintenance table SDT. It should be noted that, when the small-data-maintenance table SDT has the data link of the first logical page, the controller deletes the original data link and fill the new mapping relationship of the first logical page and the first physical page into the small-data-maintenance table SDT.

When the length of the first data sector is more than the predetermined length, the controller 160 further determines whether any of the large-data-maintenance tables LDT0~LDTN corresponds to the first logical block that includes the first logical page. In one of the embodiments, the controller 160 determines whether the physical-to-logical-block-mapping table FHT has a mapping relationships of the first logical block to determine whether any of the large-data-maintenance tables LDT0~LDTN is corresponding the first logical block, but it is not limited thereto. When the large-data-maintenance tables LDT0~LDTN includes a first large-data-maintenance table that corresponds to the first logical block, the controller 160 records the mapping relationship of the first logical page and the first physical page in the first large-data-maintenance table and determines whether the small-data-maintenance table SDT has at least one first data link of the first logical page. When the small-data-maintenance table SDT has the first data link of the first logical page, the controller 160 deletes the first data link of the small-data-maintenance table SDT. When the first data sector is more than the predetermined length and none of the large-data-maintenance tables LDT0~LDTN is the first large-data-maintenance table that corresponds to the first logical block, the controller 160 produces the first large-data-maintenance table to record the mapping relationship of the first logical page and the first physical page in the first large-data-maintenance table and determines whether the small-data-maintenance table SDT has at least one first data link of the first logical page. When the small-data-maintenance table SDT has the first data link of the first logical page, the controller 160 deletes the first data link from the small-data-maintenance table SDT.

Figure 6A:
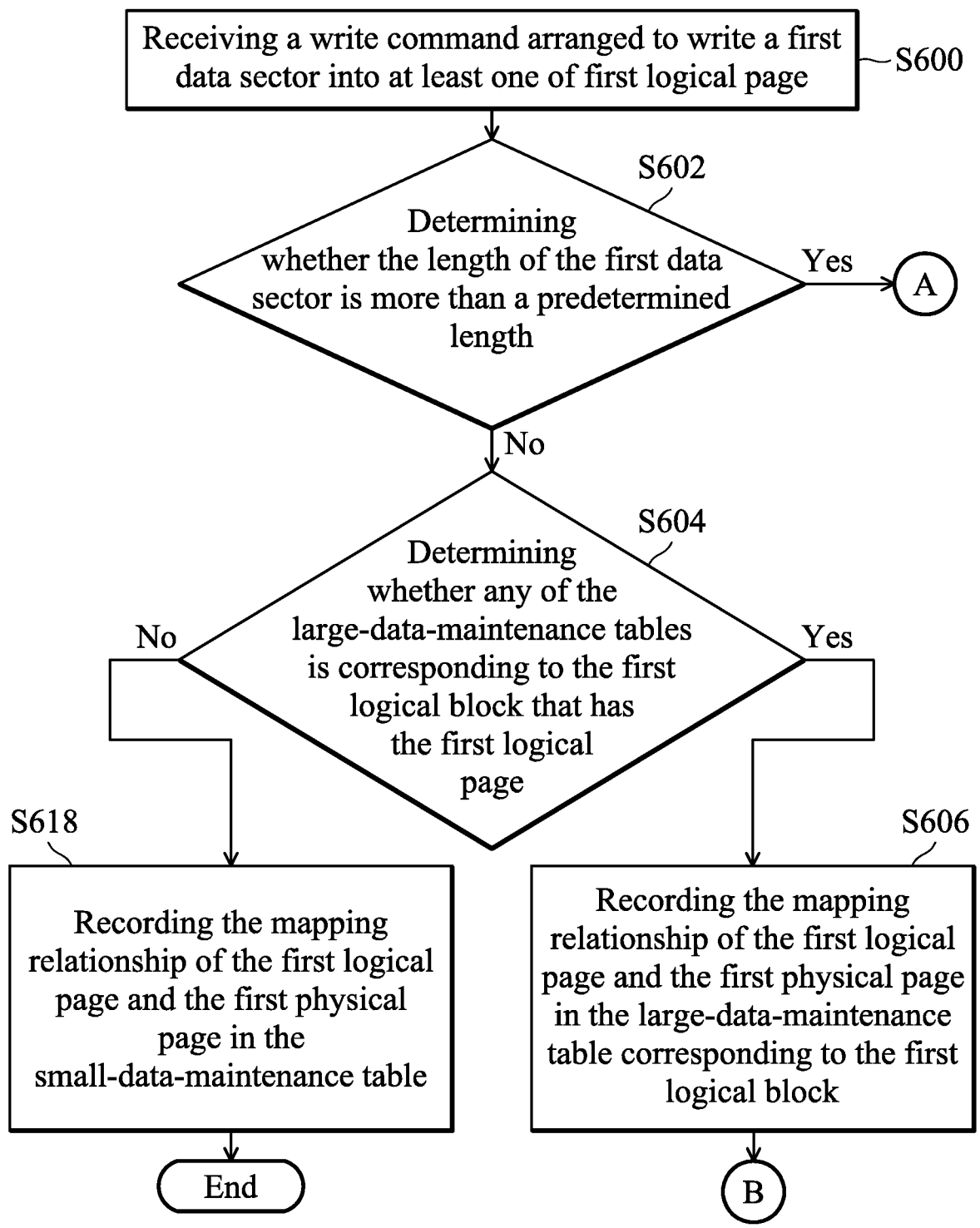
FIGS. 6A-6B is a flowchart of a data maintenance method constructed in accordance with some embodiments.
Figure 6B:
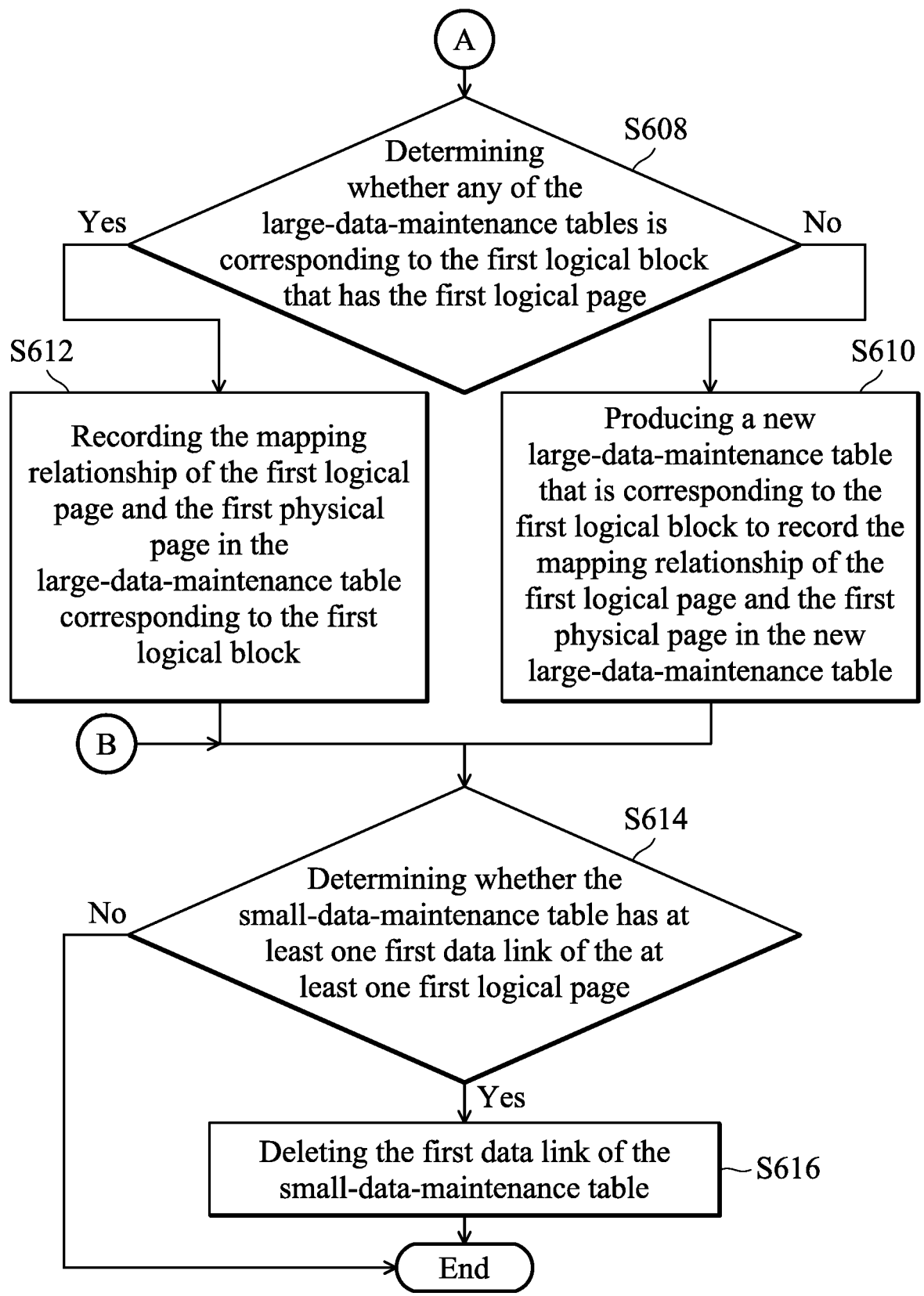

FIGS. 6A-6B is a flowchart of a data maintenance method constructed in accordance with some embodiments. The data maintenance method is applied to the data storage device 140 of FIG. 1. The process starts at step S600.

In step S600, the controller 160 receives a write command arranged to write a first data sector into at least one of first logical page from the host 120 for writing the first data sector into at least one first physical page of the physical pages.

Next, in step S602, the controller 160 determines whether the length of the first data sector is more than a predetermined length for deciding the first data sector is belong to the big data or small data. In one of the embodiments, the predetermined length is equal to the length of one physical page, but it is not limited thereto. When the first data sector is more than the predetermined length, the process goes to step S608, otherwise the process goes to step S604.

In step S604, the controller 160 determines whether any of the large-data-maintenance tables LDT0~LDTN corresponds to the first logical block that has the first logical page. When one of the large-data-maintenance tables LDT0~LDTN corresponds to the first logical block that has the first logical page, the process goes to step S606, otherwise the process goes to step S618.

In step S606, the controller 160 records the mapping relationship of the first logical page and the first physical page in the large-data-maintenance table corresponding to the first logical block.

In step S608, the controller 160 determines whether any of the large-data-maintenance tables LDT0~LDTN corresponds to the first logical block that has the first logical page. When one of the large-data-maintenance tables LDT0~LDTN corresponds to the first logical block that has the first logical page, the process goes to step S612, otherwise the process goes to step S610.

In step S610, the controller 160 produces a new large-data-maintenance table that corresponds to the first logical block to record the mapping relationship of the first logical page and the first physical page in the new large-data-maintenance table, and records the mapping relationship of the first logical block and the first physical block that has the first physical page in the physical-to-logical-block-mapping table FHT.

In step S612, the controller 160 records the mapping relationship of the first logical page and the first physical page in the large-data-maintenance table corresponding to the first logical block.

Next, in step S614, the controller 160 determines whether the small-data-maintenance table SDT has at least one first data link of the first logical page. When the small-data-maintenance table SDT has the first data link of the first logical page, the process goes to step S612, otherwise the process ends at step S608.

In step S612, the controller 160 deletes the first data link of the small-data-maintenance table SDT. For example, when the controller 160 receives a write command arranged to write a first data sector into the first logical pages HP1~HP10 of the first logical block HB0 from the host 120, and writes the first data sector into the physical page FP11~FP20 of the physical block FB2 in response to the write command. As described above, the first data sector needs 10 physical pages to be stored, such that the first data sector is belonging to big data. Therefore, the controller 160 records the mapping relationship of the first logical block HB0 and the physical block FB2 in the physical-to-logical-block-mapping table FHT in step S610, and records the mapping relationship of the first logical pages HP1~HP10 and the first physical pages FP11~FP20 in the large-data-maintenance table LDT0 (or records the mapping relationship of the first logical pages HP1~HP10 and the first physical pages FP11~FP20 in the large-data-maintenance table LDT0 that already exists in step S612). If the controller 160 determines that the small-data-maintenance table SDT has the data links of the first logical pages HP2 and HP5 of the first logical pages HP1~HP10, the controller 160 deletes the data links of the first logical pages HP2 and HP5 in small-data-maintenance table SDT in step S616. The process ends at step S616.

In another embodiment, the controller 160 receives a write command that indicates to write a first data sector into the first logical page HP1 of the first logical block HB0 from the host 120, and writes the first data sector into the physical page FP11 of the physical block FB2 in response to the write command. The first data sector needs only one physical page to be stored, such that the first data sector belongs to small data and the mapping relationship of the first logical page HP1 and the first physical page FP11 is arranged to be record in the large-data-maintenance table LDT0 in step S606. If the controller 160 determines that the small-data-maintenance table SDT has the data link of the first logical page HP1 in step S614, the controller 160 deletes the data link of the first logical page HP1 in the small-data-maintenance table SDT in step S616. The process ends at S616.

In step S618, the controller 160 records the mapping relationship of the first logical page and the first physical page in the small-data-maintenance table SDT. After the controller 160 writes the mapping relationship of the first logical page and the first physical page in to a new column of the small-data-maintenance table SDT, the controller 160 further checks whether the small-data-maintenance table SDT has other data links that also correspond to the first logical page. When the small-data-maintenance table SDT has one or more other data links of the first logical page, the controller 160 deletes the other data links. The process ends at step S618.

The data storage device 140 and the data maintenance method can maintain the data by two systems according to the length of the data.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a flash memory, comprising a plurality of physical blocks, each of the physical blocks has a plurality of physical pages; and
   a controller, receiving a write command arranged to write a first data sector into a first logical page, writing the first data sector into at least one first physical page of the physical pages in response to the write command, determining whether a plurality of large-data-maintenance tables comprise a first large-data-maintenance table corresponding to a first logical block comprising the first logical page when a length of the first data sector is less than a predetermined length, recording a mapping relationship of the first logical page and the first physical page in the first large-data-maintenance table and determining whether a small-data-maintenance table has at least one first data link of the at least one first logical page when one of the large-data-maintenance tables is the first large-data-maintenance table corresponding to the first logical block, and deleting the at least one first data link of the small-data-maintenance table when the small-data-maintenance table has the at least one first data link of the at least one first logical page;
   wherein the small-data-maintenance table is arranged to record different logical blocks and the physical blocks and the physical pages corresponding to the logical pages of the logical blocks;
   wherein the small-data-maintenance table comprises a plurality of columns, when the number of columns of the small-data-maintenance table is more than a predetermined threshold, the controller further selects a logical block and organizes the physical pages of the selected logical block, and then deletes the columns corresponding to the selected logical block.

2. The data storage device as claimed in claim 1, wherein the controller further records the mapping relationship of the first logical page and the first physical page in the small-data-maintenance table when the length of the first data sector is less than the predetermined length and none of the large-data-maintenance tables corresponds to the first logical block.

3. The data storage device as claimed in claim 1, wherein the controller further determines whether the large-data-maintenance tables comprise the first large-data-maintenance table corresponding to the first logical block comprising the first logical page when the length of the first data sector is more than the predetermined length, records the mapping relationship of the first logical page and the first physical page in the first large-data-maintenance table and determines whether the small-data-maintenance table has the at least one first data link corresponding to the at least one first logical page when one of the large-data-maintenance tables is the first large-data-maintenance table corresponding to the first logical block, and deleting the first data link of the small-data-maintenance table when the small-data-maintenance table has the at least one first data link corresponding to the at least one first logical page.

4. The data storage device as claimed in claim 3, wherein the controller further produces the first large-data-maintenance table to record the mapping relationship of the first logical page and the first physical page and determines whether the small-data-maintenance table has the at least one first data link of the at least one first logical page when the length of the first data sector is more than the predetermined length and none of the large-data-maintenance tables corresponds to the first logical block, and deletes the first data link of the small-data-maintenance table when the small-data-maintenance table has the first data link of the first logical page.

5. The data storage device as claimed in claim 1, wherein each of the large-data-maintenance tables is arranged to record data links of the physical pages of the one of the physical blocks and a plurality of logical pages of a corresponding logical block of a plurality of logical blocks.

6. The data storage device as claimed in claim 5, further comprising a physical-to-logical-block-mapping table arranged to record mapping relationships of the physical blocks and the logical blocks corresponding to the large-data-maintenance tables, and the controller further determines whether the physical-to-logical-block-mapping table contains the mapping relationship of the first logical block to determine whether any of the large-data-maintenance tables corresponds to the first logical block comprising the first logical page.

7. The data storage device as claimed in claim 1, wherein the predetermined length is equal to length of one physical page.

8. A data maintenance method, applied to a data storage device, wherein the data storage device has a plurality of physical blocks, each of the physical blocks has a plurality of physical pages, and the data maintenance method comprises:
receiving a write command arranged to write a first data sector into at least one first logical page for writing the first data sector into at least one first physical page of the physical pages;
determining whether a length of the first data sector is more than a predetermined length;
determining any of the large-data-maintenance tables corresponds to the first logical block having the first logical page when the length of the first data sector is less than a predetermined length;
recording a mapping relationship of the first logical page and the first physical page in the first large-data-maintenance table and determining whether a small-data-maintenance table has at least one first data link corresponding to the first logical page when a first large-data-maintenance table of the large-data-maintenance tables corresponds to the first logical block; and
deleting the first data link of the small-data-maintenance table when the small-data-maintenance table has the first data link of the first logical page;
wherein the small-data-maintenance table is arranged to record different logical blocks and the physical blocks and the physical pages corresponding to the logical pages of the logical blocks;
wherein the small-data-maintenance table comprises a plurality of columns, and the data maintenance method further comprises:
when the number of columns of the small-data-maintenance table is more than a predetermined threshold, selecting a logical block and organizing the physical pages of the selected logical block, and then deleting the columns corresponding to the selected logical block.

9. The data maintenance method as claimed in claim 8, further comprising recording the mapping relationship of the first logical page and the first physical page in the small-data-maintenance table when the length of the first data sector is less than the predetermined length and none of the large-data-maintenance table corresponds to the first logical block.

10. The data maintenance method as claimed in claim 8, further comprising:
determining any of the large-data-maintenance tables corresponds to the first logical block having the first logical page when the length of the first data sector is more than the predetermined length;
recording the mapping relationship of the first logical page and the first physical page in the first large-data-maintenance table and determining whether the small-data-maintenance table has the at least one first data link of the at least one first logical page when the first large-data-maintenance table of the large-data-maintenance tables corresponds to the first logical block; and
deleting the first data link of the small-data-maintenance table when the small-data-maintenance table has the at least one first data link of the at least one first logical page.

11. The data maintenance method as claimed in claim 10, further comprising:
producing the first large-data-maintenance table to record the mapping relationship of the first logical page and the first physical page in the first large-data-maintenance table and determining whether the small-data-maintenance table has the at least one first data link of the at least one first logical page when the length of the first data sector is more than the predetermined length and the large-data-maintenance tables does not have the first large-data-maintenance table corresponding the first logical block; and
deleting the first data link of the small-data-maintenance table when the small-data-maintenance table has the at last one first data link of the at least one first logical page.

12. The data maintenance method as claimed in claim 8, wherein each of the large-data-maintenance tables is arranged to record data links of the physical pages of one of the physical blocks and a plurality of logical pages of a corresponding logical block of a plurality of logical blocks.

13. The data maintenance method as claimed in claim 12, further comprising determining whether a physical-to-logical-block-mapping table contains the mapping relationship of the first logical block to determine whether any of the large-data-maintenance tables corresponds to the first logical block having the first logical page, wherein the physical-to-logical-block-mapping table is arranged to record the mapping relationship of the logical block and the physical block in the large-data-maintenance table.

14. The data maintenance method as claimed in claim 8, wherein the predetermined length is equal to the length of the physical page.

* * * * *